United States Patent
Liao et al.

(10) Patent No.: US 8,390,930 B2
(45) Date of Patent: Mar. 5, 2013

(54) OPTICAL ELEMENT AND MANUFACTURE METHOD THEREOF

(75) Inventors: Min-Chih Liao, Taipei (TW); Jau-Jan Deng, Taipei (TW); Wei-Chung Chang, Taoyuan (TW)

(73) Assignees: OmniVision Technologies, Inc., Santa Clara, CA (US); VisEra Technologies Company Limited, Hsinchu (TW)

( * ) Notice: Subject to any disclaimer, the term of this patent is extended or adjusted under 35 U.S.C. 154(b) by 960 days.

(21) Appl. No.: 12/274,661

(22) Filed: Nov. 20, 2008

(65) Prior Publication Data

US 2010/0123817 A1    May 20, 2010

(51) Int. Cl.
*G02B 27/10*    (2006.01)
(52) U.S. Cl. ........................ 359/618; 359/694
(58) Field of Classification Search ................ 359/618
See application file for complete search history.

(56) References Cited

U.S. PATENT DOCUMENTS

| | | | | |
|---|---|---|---|---|
| 5,770,120 | A * | 6/1998 | Kamihara et al. | 264/1.27 |
| 7,179,536 | B1 * | 2/2007 | Hosoe et al. | 428/446 |
| 7,969,666 | B2 * | 6/2011 | Chen | 359/819 |
| 2005/0146800 | A1 * | 7/2005 | Yamada et al. | 359/738 |
| 2006/0202106 | A1 * | 9/2006 | Nishikawa et al. | 250/208.1 |
| 2007/0058904 | A1 * | 3/2007 | Ban et al. | 385/52 |
| 2010/0165183 | A1 * | 7/2010 | Tian | 348/374 |

FOREIGN PATENT DOCUMENTS

| | | |
|---|---|---|
| CN | 101105565 A | 1/2008 |
| JP | 2008-094658 | 4/2008 |

* cited by examiner

*Primary Examiner* — James Jones
(74) *Attorney, Agent, or Firm* — Muncy, Geissler, Olds & Lowe, PLLC

(57) ABSTRACT

An optical element and image capture lens structure. The optical element includes a substrate and an optical component with at least one effective area and non-effective area, formed on the substrate, wherein the non-effective area has a rough surface. The image capture lens structure includes a substrate, an optical component formed on the substrate, and a spacer with a micro structure, attached to the substrate by an adhesive, wherein the micro structure is located between the adhesive and the optical component to prevent the overflow of the adhesive.

20 Claims, 5 Drawing Sheets

OPTICAL ELEMENT AND MANUFACTURE METHOD THEREOF

BACKGROUND OF THE INVENTION

1. Field of the Invention

The present invention relates to an optical element, and in particular relates to a wafer-level optical element, image capture lens structure and manufacturing thereof.

2. Description of the Related Art

In recent years, image capture apparatuses, such as mobile phones with a photographing function and digital cameras have become popular due to employment of solid-state image capture devices, such as CCD (charged coupled device) type image sensors, CMOS (complementary metal oxide semiconductor) type image sensors and the like, which are capable of meeting demands for higher performance and miniaturization. In such image capture devices, taking a picture is performed by forming an object image on a detecting surface of the image capture device so as to capture an image, and then the image data is read (i.e. output).

In the image capture apparatus, the optical elements include refractive components such as lenses and diffractive and/or refractive micro-optical components for influencing an optical beam in a pre-defined manner.

When optical elements are produced by replication, there is often a basic configuration involving a substrate and replication material on a surface thereof. The replication material can be shaped and hardened in the course of a replication process.

Conventionally, the optical element includes effective areas and non-effective areas, wherein both effective and non-effective areas are very smooth, as like a mirror. Unfortunately, the smooth non-effective area reflects large angles or any unnecessary light to cause stray-light of images, wherein stray-light significantly impacts image quality. In addition, when an optical element is bonded to another optical element, the bonding adhesive usually overflows and closes the optical path (effective area). The leaked adhesive also reflects the unnecessary light resulting in image destruction.

FIGS. 1A and 1B are cross-sectional views illustrating a conventional structure of a wafer-level optical element. As shown in FIG. 1A, an optical element 10 is composed of a substrate 12 and lens 14. The lens 14 is indicated by two areas including non-effective area 142 and effective area 144. As discussed above, both effective and non-effective areas are smooth so that unnecessary light is reflected to cause stray-light of image. Additionally, referring to FIG. 1B, an optical element is bonded to another optical element to form a wafer level image capture lens by using a spacer 16 and an adhesive 18, wherein the adhesive usually overflow to close or contact the non-effective area 142. Similarly, the unnecessary light also can be reflected by the leaked adhesive 20. The image sensor, such as a CMOS or CCD, thus usually catches the reflected light, resulting in decrease of image quality.

Thus, a novel manufacturing method and an optical structure are required to mitigate the previously mentioned problems.

BRIEF SUMMARY OF THE INVENTION

The present invention provides an optical element, comprising a substrate, and an optical component with at least one effective area and non-effective area, formed on the substrate, wherein the non-effective area has a rough surface.

The present invention also provides an image capture lens structure comprising a substrate, an optical component formed on the substrate, and a spacer with a micro structure, attached to the substrate by an adhesive, wherein the micro structure is located between the adhesive and the optical component to prevent the overflow of the adhesive.

The present invention further provides a method for manufacturing an optical element including providing a substrate and providing a replication tool with at least one smooth surface area and at least one rough surface area, that defines the shape of the optical element. The method also includes pressing the replication tool against the substrate with a replication material and confining the replication material to a predetermined area of the substrate, wherein the predetermined area exceeds a desired area of the optical element on the substrate. Additionally, the method includes hardening the replication material to form an optical element including at least one effective area and non-effective area.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In one aspect of the invention, an optical element of the present invention is provided. The optical element comprises a substrate and an optical component with at least one effective area and non-effective area, formed on the substrate, wherein the non-effective area has a rough surface. The non-effective area with rough surface can scatter unnecessary light to prevent influences of unnecessary light and improve image quality.

Figure 1A:
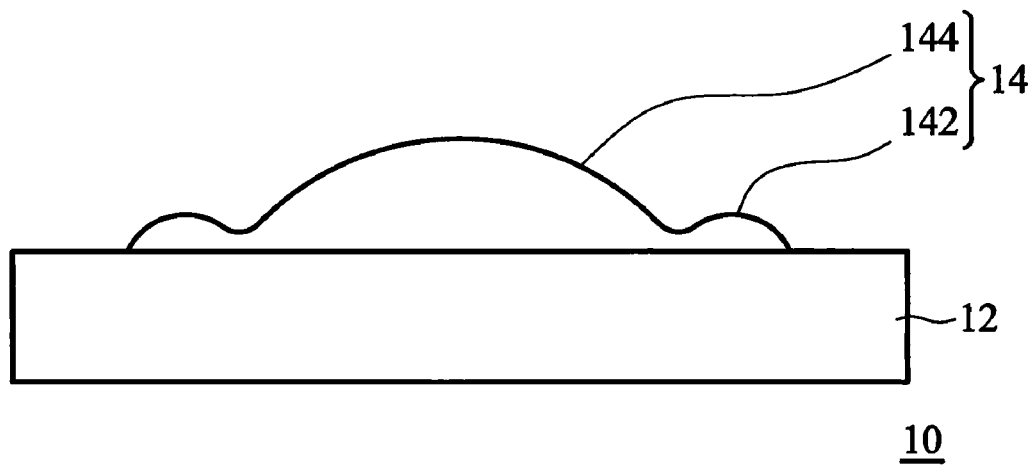
FIGS. 1A-1B are cross section views showing a wafer-level optical element and image capture lens structure.
Figure 1B:
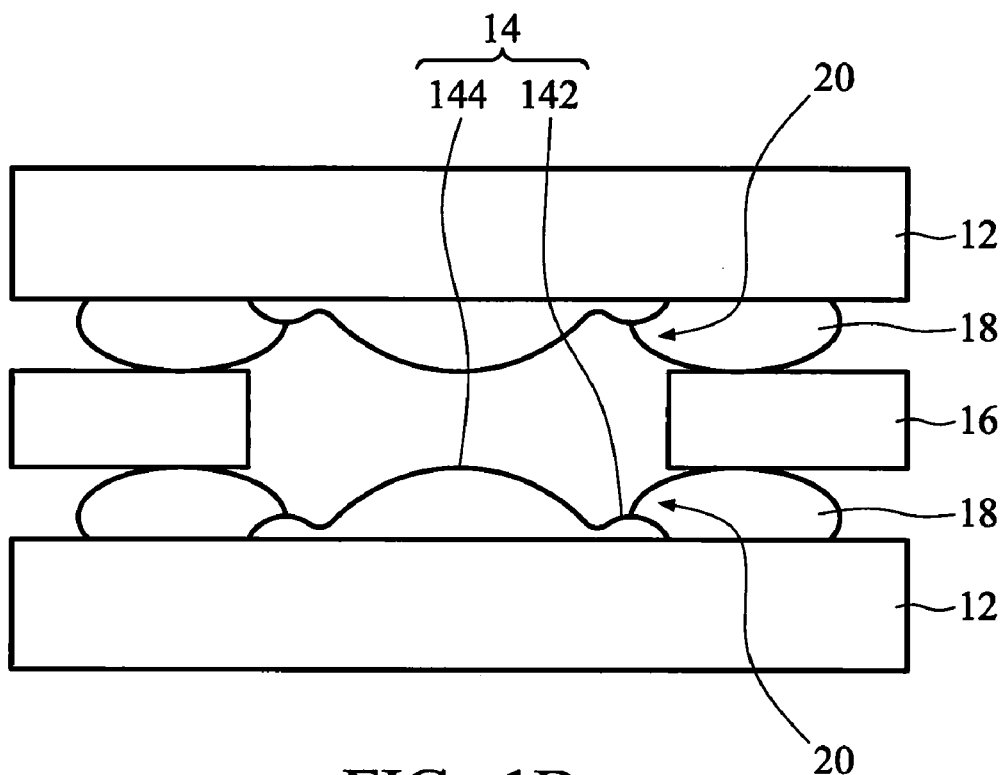
Figure 2A:
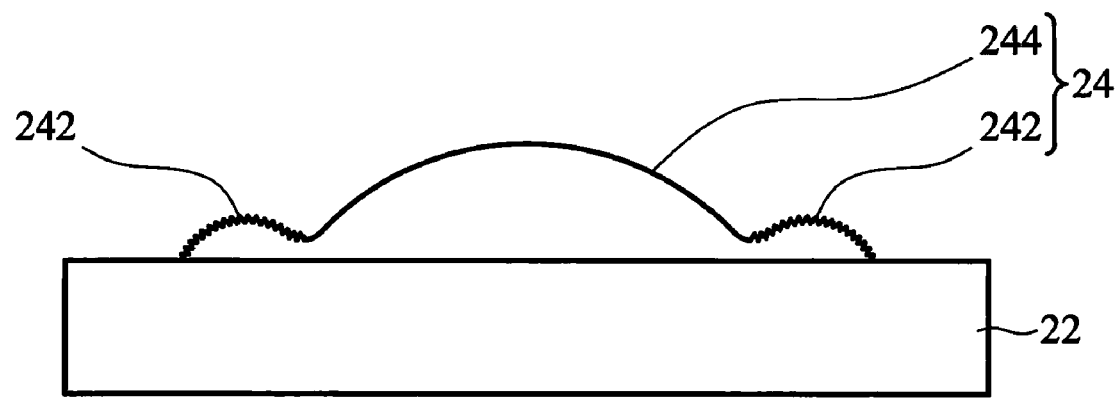
FIG. 2A is a cross session of the optical element with a rough surface according to an embodiment of the invention.
Figure 2B:
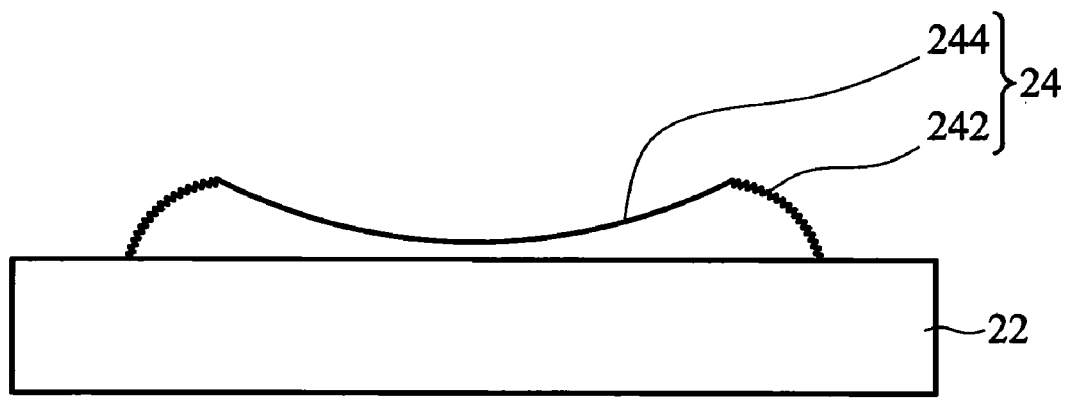
FIG. 2B is a cross session of the optical element with a rough surface according to another embodiment of the invention.
Figure 2C:
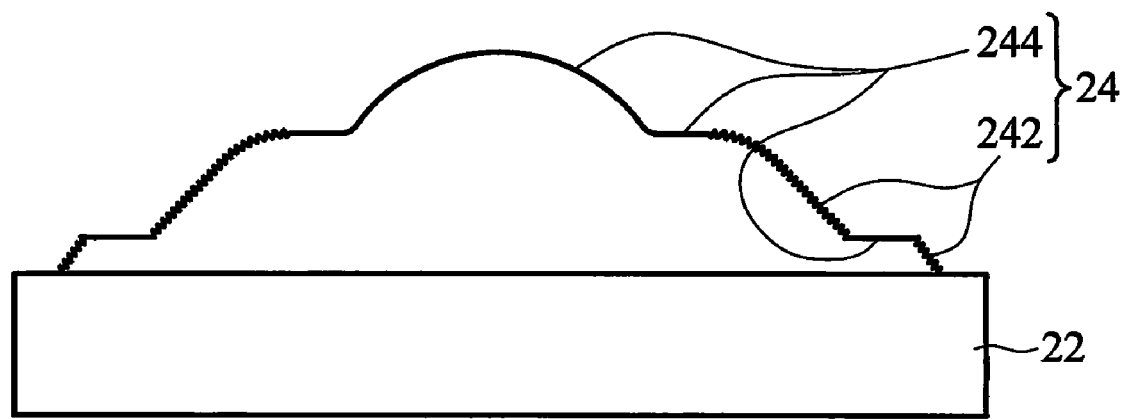
FIG. 2C is a cross session of the optical element with a rough surface according to yet another embodiment of the invention.

FIGS. 2A to 2C, respectively, illustrate an embodiment of an optical element according to the present invention. It should be understood that the drawings herein are made in simplicity, and are utilized for illustrating associated elements related to the invention. In practical usage however, the semiconductor package is more complexly structured.

Referring to FIG. 2A, an optical element 10 includes a substrate 22 and an optical component (lens) 24, wherein the optical component 24 includes at least one non-effective area 242 and effective area 244. The effective area 244 of the optical component 24 may has a smooth surface and defined angles to produce a desired image. The effective area may have a surface roughness Ra of about 1-20 nm, or 5-15 nm. It should be noted that the non-effective area 242 is rough. The non-effective area 242 has a surface roughness Ra of about 100-10000 nm. In another embodiment, the surface roughness Ra of non-effective area 242 can be 500-5000 nm. The rough surface of non-effective area 242 therefore can scatter unnecessary light and prevent light reflection and stray-light of images.

In other embodiments, the optical component (lens) 24 may have any suitable profile, depending on the image forming apparatus or methods, to produce a desired image. For example, the optical component 24 can be a concave mirror, or irregular mirror. Referring to FIG. 2B, the optical component 24 (a concave mirror) includes a non-effective area 242 and effective area 244, wherein the non-effective area 242 has a rough surface of Ra of about 100-10000 nm, but is not limited thereto. As shown in FIG. 2C, the optical component 242 is an irregular mirror, which includes a plurality of non-effective areas 242 and effective areas 244. Similarly, the effective areas 244 are smooth and non-effective areas 242 are rough. The rough surface of non-effective areas can have a roughness Ra of about 100-10000 nm. In one embodiment, the surface of each non-effective area 242 may have the same roughness. In another embodiment, the surface of each non-effective area 242 may have different roughness.

In another aspect of the invention, a method for manufacturing an optical element is provided. The method includes providing a substrate and providing a replication tool with at least one smooth surface area and at least one rough surface area, wherein the replication tool defines the shape of the optical element. The method also includes pressing the replication tool against the substrate with a replication material and confining the replication material to a predetermined area of the substrate, wherein the predetermined area exceeds a desired area of the optical element on the substrate. Additionally, the method includes hardening the replication material to form the optical element including at least one effective area and non-effective area.

Figure 3A:
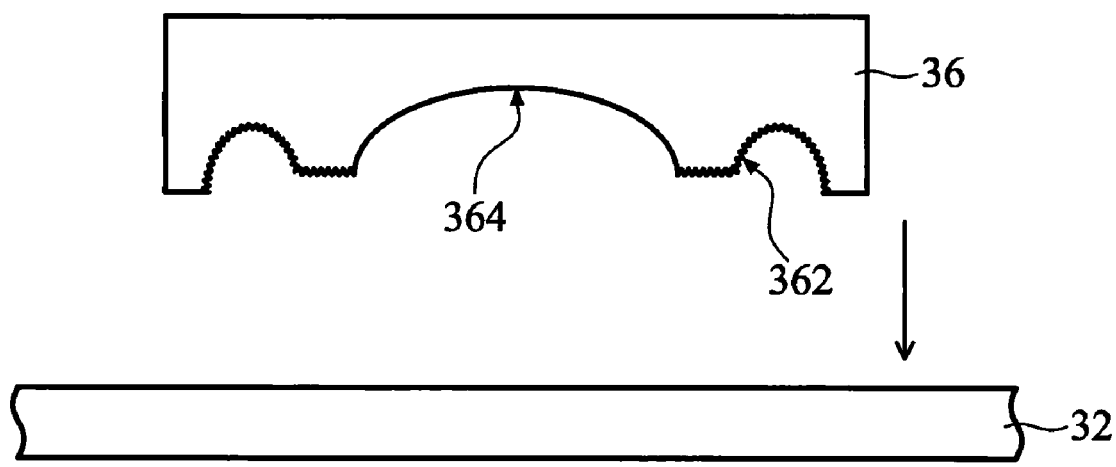
FIGS. 3A-3B are schematic diagrams showing the steps involved in manufacturing an optical element of the present invention.
Figure 3B:
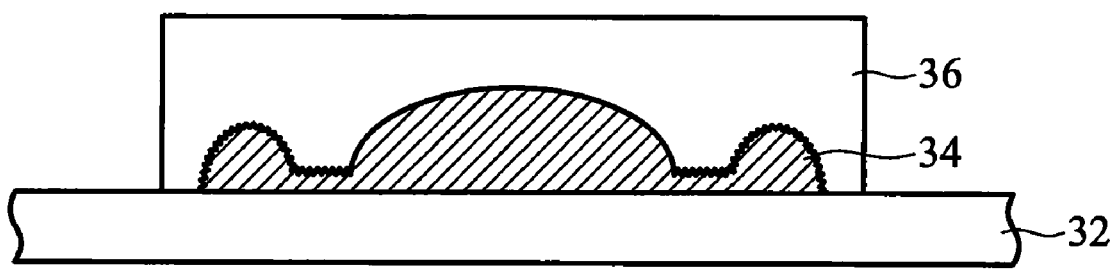

FIGS. 3A-3B are cross-sectional views illustrating an embodiment of a method for manufacturing the optical element of the present invention. It should be understood that the drawings herein are made in simplicity, and are utilized for illustrating associated elements related to the invention.

Referring to FIG. 3A, a substrate 32 is provided. The substrate can be a glass substrate or other transparent substrate, such as a quartz substrate.

A replication tool 36 is provided. The replication tool 36 can includes one or more portions, each defining a negative structural feature that defines the shape of the optical element, such as a lens. In should be noted that the portions of the replication tool 36 includes at least one rough surface portion 362 and smooth surface portion 364, wherein the rough surface portion 362 is rough. The rough surface portion 362 can have a surface roughness Ra of about 100-10000 nm, or 500-5000 nm.

The surface of the rough surface portion 362 can be performed by using any suitable mechanical or chemical method. The methods include, but are not limited to, polishing, etching, honing, sand blast and/or EDM (electric discharge machining). There are many methods for manufacturing the surface of the rough surface portion 362. One of ordinary skill in the art will select the appropriate method and protocol to use. These and many other methods will be readily apparent to those of ordinary skill in the art, and are considered as equivalents within the scope of the present invention.

Referring to FIG. 3B, the replication tool 36 and the substrate 32 are brought together for the embossing process. Replication material 34 in a liquid or viscous or plastically deformable state is placed on the replication tool 36 and/or the substrate 32. The reapplication material 34 may be UV curable optical material for cold or hot embossing, such as Exguide™ from ChemOptics, Ormocer® from Micro Resist, PAK-01 from Toyo Gosei, TSR-820 from Teijin Seiki, or Ino®flex from Inomat. The force by which the replication tool 36 and the substrate 32 are pressed against each other may be chosen based on specific requirements. For example, the force may be just the weight of the replication tool when in a lying position, by way of spacer portions abutting the substrate surface and/or floating on a thin basis layer of replication material, on the substrate. Alternatively, the substrate may lie on the replication tool. In another embodiment, the force may be higher or lower than the weight and may, for example, be applied by a mask aligner or similar device which controls the distance of the substrate and the replication tool during the replication process.

In one embodiment, the rough surface portion 362 may be designed to produce the non-effective area of the optical component. In another embodiment, the rough surface portion 362 may be designed to control the flow of the replication material 34. The flow of replication material 34 can be limited, controlled, and/or stopped by capillary forces, surface tension and/or surface roughness to form the desired optical element.

After the replication tool is placed on the substrate, the replication material is hardened. Depending on the replication material chosen, it may be hardened by curing; for example UV curing. As an alternative, it may be hardened by cooling. Depending on the replication material chosen, other hardening methods are possible. Subsequently, the replication tool and the replication material are separated from each other. The replication material thus remains on the substrate to form an optical component (lens) including at least one rough area (non-effective area 342) by the rough surface portion 362.

In yet another aspect of the invention, an image capture lens structure of the present invention is provided. The image capture lens structure includes a substrate, an optical component formed on the substrate, and a spacer with a micro structure, attached to the substrate by an adhesive, wherein the micro structure is located between the adhesive and the optical component to prevent the overflow of the adhesive. The micro structure can prevent the overflow and leakage of the adhesive to protect the optical component.

Figure 4:
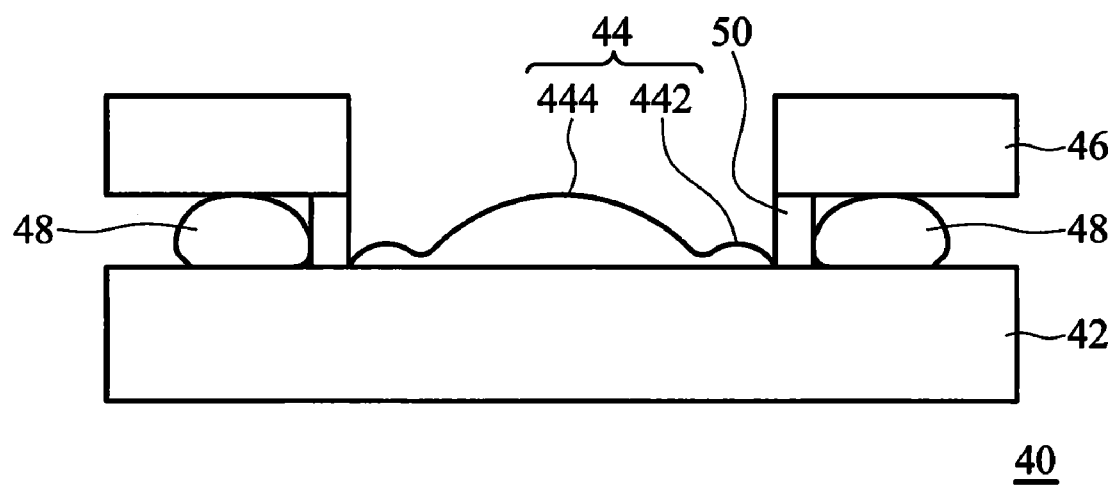
FIG. 4 is a cross session of the image capture lens structure showing a micro structure between an adhesive and an optical component according to one embodiment of the present invention.

FIG. 4 is a cross-sectional view illustrating an image capture lens structure of the present invention. It should be understood that the drawings herein are made in simplicity, and are utilized for illustrating associated elements related to the invention. As shown in FIG. 4, an image capture lens structure 40 is composed of a substrate 42, an optical component 44, and a spacer 46 attached to the substrate by an adhesive 48. The spacer 46 includes one or more micro structures 50, which is located between the adhesive 48 and the optical component 44 (or non-effective area of optical component) to prevent the overflow of the adhesive. The micro structure 50 is formed to prevent overflow of the adhesive and protect the optical component. Similarly, the optical component 44 may includes a non-effective area 442 and effective area 444, wherein the non-effective area 442 has a rough surface of Ra of about 100-10000 nm, or 500-5000 nm, but is not limited thereto.

In order to prevent overflow of the adhesive, the micro structure 50 preferably connects to the substrate. Any suitable shape or profile for preventing overflow can be used. For example, the shape of the micro structure 50 includes, but is not limited to, linear, circular, square, triangular, or polygonal. Alternatively, the micro structure 50 may surround the adhesive 48. The micro structure 50 can be manufactured by any material, and methods. In one embodiment, the spacer 46 and micro structure 50 can be formed by using the same material. In another embodiment, the spacer and micro structure 50 can be formed by using different material and different manufacturing process.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical element, comprising
    a substrate; and
    an optical component with at least one effective area and non-effective area, formed on the substrate, wherein the optical component is a lens, the non-effective area has a rough surface, and the non-effective area has a surface roughness Ra of about 100-10000 nm.
2. The optical element as claimed in claim 1, wherein the non-effective area has a surface roughness Ra of about 500-5000 nm.
3. The optical element as claimed in claim 1, wherein the effective area has a smooth surface.
4. The optical element as claimed in claim 1, wherein the effective area has a surface roughness Ra of about 1-20 nm.
5. The optical element as claimed in claim 1, wherein the effective area has a surface roughness Ra of about 5-15 nm.
6. An image capture lens structure, comprising
    a substrate;
    an optical component formed on the substrate; and
    a spacer with a micro structure, attached to the substrate by an adhesive, wherein the micro structure is located between the adhesive and the optical component to prevent the overflow of the adhesive, and the micro structure surrounds the adhesive.
7. The image capture lens structure as claimed in claim 6, wherein the micro structure substantially contents the substrate.
8. The image capture lens structure as claimed in claim 6, wherein the micro structure is linear, circular, square, triangular, or polygonal.
9. The image capture lens structure as claimed in claim 6, wherein the optical component comprises at least one effective area and non-effective area.
10. The image capture lens structure as claimed in claim 9, wherein the micro structure is located between the non-effective area and the adhesive.
11. A method for manufacturing an optical element, comprising
    providing a substrate;
    providing a replication tool with at least one smooth surface portion and at least one rough surface portion, that defines the shape of the optical element;
    pressing the replication tool against the substrate with a replication material;
    confining the replication material to a predetermined area of the substrate, wherein the predetermined area exceeds a desired area of the optical element on the substrate; and
    hardening the replication material to form the optical element including at least one effective area and non-effective area, wherein the non-effective area as a rough surface.
12. The method as claimed in claim 11, wherein the rough surface portion has a surface roughness Ra of about 100-10000 nm.
13. The method as claimed in claim 11, wherein the rough surface portion has a surface roughness Ra of about 500-5000 nm.
14. The method as claimed in claim 11, wherein the rough surface portion controls atm flow direction of the replication material.
15. The method as claimed in claim 11, wherein the smooth surface portion has a surface roughness Ra of about 1-20 nm.
16. The method as claimed in claim 11, wherein the smooth surface portion has a surface roughness Ra of about 5-15 nm.
17. The method as claimed in claim 11, wherein the optical element is a lens.
18. The optical element as claimed in claim 1, wherein the at least one non-effective area comprises a plurality of non-effective areas, the at least one effective area being disposed between the plurality of non-effective areas.
19. The optical element as claimed in claim 18, wherein the at least one effective area has a smooth surface and a curved contour.
20. The optical element as claimed in claim 1, wherein the at least one non-effective area is disposed on only one surface of the substrate.

* * * * *